(12) United States Patent
Botto

(10) Patent No.: US 8,098,040 B1
(45) Date of Patent: Jan. 17, 2012

(54) RAM AIR DRIVEN TURBINE GENERATOR BATTERY CHARGING SYSTEM USING CONTROL OF TURBINE GENERATOR TORQUE TO EXTEND THE RANGE OF AN ELECTRIC VEHICLE

(76) Inventor: David Chandler Botto, Indian Harbour Beach, FL (US)

( * ) Notice: Subject to any disclaimer, the term of this patent is extended or adjusted under 35 U.S.C. 154(b) by 319 days.

(21) Appl. No.: 12/455,235

(22) Filed: May 29, 2009

Related U.S. Application Data

(60) Provisional application No. 61/132,997, filed on Jun. 25, 2008.

(51) Int. Cl.
*H01M 10/44* (2006.01)

(52) U.S. Cl. .......................................... 320/101; 290/44

(58) Field of Classification Search .................... 320/101
See application file for complete search history.

(56) References Cited

U.S. PATENT DOCUMENTS

| | | |
|---|---|---|
| 3,556,239 A | 1/1971 | Spahn |
| 3,713,503 A | 1/1973 | Haan |
| 3,876,925 A | 4/1975 | Stoeckert |
| 3,878,913 A | 4/1975 | Lionts et al. |
| 3,971,454 A | 7/1976 | Waterbury |
| 4,019,828 A | 4/1977 | Bunzer |
| 4,134,469 A | 1/1979 | Davis |
| 4,168,759 A | 9/1979 | Hull et al. |
| 4,179,007 A | 12/1979 | Howe |
| 4,254,843 A | 3/1981 | Han et al. |
| 4,265,591 A | 5/1981 | Gurbin |
| 4,314,160 A | 2/1982 | Boodman et al. |
| 4,423,368 A | 12/1983 | Bussiere |
| 4,424,452 A | 1/1984 | Francis |
| 4,660,879 A | 4/1987 | Kobayashi |
| 5,280,827 A | 1/1994 | Taylor et al. |
| 5,287,004 A | 2/1994 | Finley |
| 5,296,746 A | 3/1994 | Burkhardt |
| 5,680,032 A | 10/1997 | Pena |
| 5,746,283 A | 5/1998 | Brighton |
| 5,760,515 A | 6/1998 | Burns |
| 5,920,127 A | 7/1999 | Damron et al. |
| 5,986,429 A * | 11/1999 | Mula, Jr. ....................... 320/101 |
| 6,138,781 A | 10/2000 | Hakala |

(Continued)

OTHER PUBLICATIONS

J.M.Miller, "Vehicle Electrical System Power Budget Optimization Using Ultra-capacitor Distributed Modules", IEEE Symposium on Vehicle Power & Propulsion, Oct. 6-8, 2004.

R.M. Schupback, "The Role of Ultra-capacitors in an Energy Storage Unit for Vehicle Power Management", IEEE Vehicular Technology Conference, VTC F03, Oct. 6-9, 2003.

(Continued)

*Primary Examiner* — Melissa Koval
*Assistant Examiner* — Robert Grant

(57) ABSTRACT

A system and method to convert the ram air energy resulting from the movement of an electric vehicle through the air mass into electric energy to recharge the energy storage devices of the vehicle while minimizing the apparatus caused drag effect on the vehicle, thereby extending the driving range of the vehicle between external charging. At least one ram air driven turbine is positioned within the vehicle, the turbine driving a mechanically coupled generator to charge the battery. Ram air is ducted in the front of the vehicle to cause the turbine generator to rotate and output electrical energy to charge the battery. The effect of variation in vehicle speed on both turbine generator output and turbine caused drag is optimized by adjusting the pitch angle of the turbine blades. At least one included ultra capacitor will implement a pre-programmed charge/discharge profile to reduce charge resistance electrical loading on the turbine generator and enable continued battery charging with minimal increase of turbine caused drag.

12 Claims, 7 Drawing Sheets

U.S. PATENT DOCUMENTS

| | | |
|---|---|---|
| 6,313,394 B1 | 11/2001 | Shugair et al. |
| 6,373,145 B1 | 4/2002 | Hamrick |
| 6,700,215 B2 | 3/2004 | Wu |
| 7,135,786 B1 | 11/2006 | Deets |
| 7,147,069 B2 | 12/2006 | Maberry |
| 2002/0066608 A1 | 6/2002 | Guenard et al. |
| 2003/0132638 A1 | 7/2003 | Simonsen |
| 2003/0155464 A1 | 8/2003 | Tseng |
| 2005/0046195 A1 | 3/2005 | Kousoulis |
| 2005/0098361 A1 | 5/2005 | Mitchell |
| 2006/0210400 A1 | 9/2006 | Hample |
| 2007/0013192 A1 | 1/2007 | Berkson |
| 2008/0143111 A1* | 6/2008 | Ichinose et al. .............. 290/44 |

OTHER PUBLICATIONS

D.New, "Automotive Applications of Ultra-capacitors", MIT Industry Consortium, Consortium Project Report Winter 2003.

Muljadi, "Axial Flux, Modular, Permanent Magnet Generator with Toroidal Windings for Wind Turbine Applications", Renewable Energy Lab, NTIS.

Gu, "Study on a Novel Hydraulic Variable Pitch System of Wind Turbines", IEEE International Conference 2008, 10.1109/ICIT.2008. 4608636.

Zhejiang Machinery and Equipment Co. Ltd, China, Variable Pitch Wind Turbine Generator System, Model WD 70(77)-1500KW.

* cited by examiner

RAM AIR DRIVEN TURBINE GENERATOR BATTERY CHARGING SYSTEM USING CONTROL OF TURBINE GENERATOR TORQUE TO EXTEND THE RANGE OF AN ELECTRIC VEHICLE

CROSS REFERENCE TO RELATED APPLICATIONS

This application claims the benefit of PPA Ser. No. 61/132,997, filed 2008 Jun. 25 by the present inventor.

STATEMENT REGARDING FEDERALLY SPONSORED RESEARCH OR DEVELOPMENT

Not Applicable

REFERENCE TO SEQUENCING LISTING, A TABLE, OR A COMPUTER PROGRAM LISTING COMPACT DISC APPENDIX

Not applicable

BACKGROUND OF THE INVENTION

The present invention relates to an electrically powered motor vehicle and, specifically, to a ram air driven turbine generator charging system for the vehicle that utilizes control of both turbine torque and electrical loading at the generator output to charge the vehicle battery and power the vehicle while minimizing the turbine caused drag resistance of the vehicle.

Prior art describes wind powered electric generator systems mounted on the roof, the hood or internal to an electric vehicle to charge the vehicle battery while the vehicle is in motion (Guenard, 2002/0066608, 2002; Deets, U.S. Pat. No. 7,135,786, 2006; Maberry, U.S. Pat. No. 7,147,069, 2006; Burns, U.S. Pat. No. 5,760,515, 1998, for example). The prior art also describes air flow management systems including both fixed and variable shroud configurations purported to control or eliminate drag resistance associated with turbine systems. The many embodiments in prior art do not consider adequately the fundamental issues inherent in converting and storing the ram air kinetic energy developed by a vehicle in motion, that is, (a) the ram air energy necessary to cause the turbine generator to rotate manifests as additional vehicle drag which, if vehicle speed is to be maintained, must be overcome by the application of additional traction drive energy and; (b) as the vehicle battery approaches full charge, the increased electrical load on the generator increases which increases the torque load on the turbine, adding to the turbine caused drag resistance. Prior art devices to control battery charge resistance affect on generator load are effective but slow acting and not efficient. The two effects are limiting in any attempt to achieve a functionally useable result in converting and storing the ram air energy of a moving electric vehicle that, in normal use, operates in a wide range of speeds and battery charge levels. It is necessary for the charging system to be effective and efficient at both low and high speeds over a range of battery charge levels. The present embodiment resolves these issues and thereby extends significantly the driving range of an electric vehicle between times that it becomes necessary to charge the vehicle by external means.

What is needed in the art is an electric vehicle, including at least one ram air driven turbine generator and at least one ultra capacitor auxiliary energy storage device, that controls turbine generator caused drag by managing turbine generator torque and battery charge resistance. This will provide for sufficient battery charging energy and vehicle power to extend the driving range of the vehicle between external battery charges.

BRIEF SUMMARY OF THE INVENTION

The present embodiment provides for a ram air powered battery charging system, including ultra capacitor assist, that will extend significantly the driving range of an electrically powered vehicle beyond that otherwise achieved before external charging is required. The embodiment maintains the desired charging current to the battery while minimizing the ram air turbine caused drag resistance of the vehicle at most vehicle speeds and levels of battery charge.

The embodiment primarily relates to, but is not limited to, an electrically powered automobile with an assembly positioned in the forward compartment that has mounted in it at least one but essentially a plurality of ram air driven turbines each mechanically coupled to and driving a separate electric generator. An aerodynamic intake and air chamber configuration directs ram air to cause rotation of the turbine generator devices and another air chamber conveys exhaust air out of the vehicle through at least one discharge port. Ram air created by the moving vehicle impinges on the turbine blades of the turbine generators causing them and their coupled generator rotors to rotate and cause an electric current to flow in the generators. The angle, or pitch, of the turbine blades relative to the direction of ram air flow is variable and computer controlled. Electrical output of the generators is modified, regulated and routed through wiring and cabling, as in prior art, to components of the charging system under control of a central processor to charge the battery. Generator output energy that is excess to that required for charging the battery is distributed and routed to power the traction drive motor and other electrical components of the vehicle as needed.

This embodiment includes the means to vary the angular position, or pitch, of the turbine blades relative to the direction of ram air flow to ensure maximum harvest of ram air kinetic energy at low speeds while controlling turbine speed, generator output and turbine caused drag resistance at highway speeds. A further embodiment includes programmed control of a variable air gap between stator and rotor of the generator, as in prior art, to enhance management of turbine torque and generator output. This embodiment also includes a programmed charging profile, obtained through ultra capacitor technology, to maintain a pre-determined level of electrical load at the generator outputs as the battery approaches full charge. By efficiently maintaining an optimum electrical load on the turbine generator, the opposing torque load on the turbine is kept at a level that allows efficient battery charging to continue at an appropriate rate with minimal increase in turbine caused drag. The ultra capacitor also provides short term power boost to the traction drive motor for vehicle acceleration. These capabilities together provide sufficient management of battery charging performance and turbine caused drag to extend vehicle driving range.

The main advantage of the embodiment is that it will enable continuous ram air driven battery charging of an electric vehicle during most vehicle speeds and levels of battery charge while maintaining acceptable levels of turbine caused drag, thereby efficiently converting the kinetic energy of ram air flow, developed by a powered vehicle in motion, to generate and store electrical energy. The present embodiment will extend the driving range of an electrically powered vehicle between times that battery charging by external means is required.

Another advantage of this embodiment is that it will provide capacitor stored energy for surge power during acceleration.

Another advantage of this embodiment is that it will fit many configurations of modern vehicles with little change to basic body and frame design.

Another advantage of this embodiment is that it enables reduction of turbine noise at highway speeds.

BRIEF DESCRIPTION OF THE SEVERAL VIEWS OF THE DRAWING

The features and advantages of the present embodiment as well as its development and operation will be clarified by reference to the following description of the embodiments as they pertain to the associated drawings.

Reference characters indicate corresponding parts throughout the figures. The descriptions herein illustrate one preferred embodiment of the invention in the form shown and are not to be construed as limiting the scope of the invention in any way.

Figure 1:
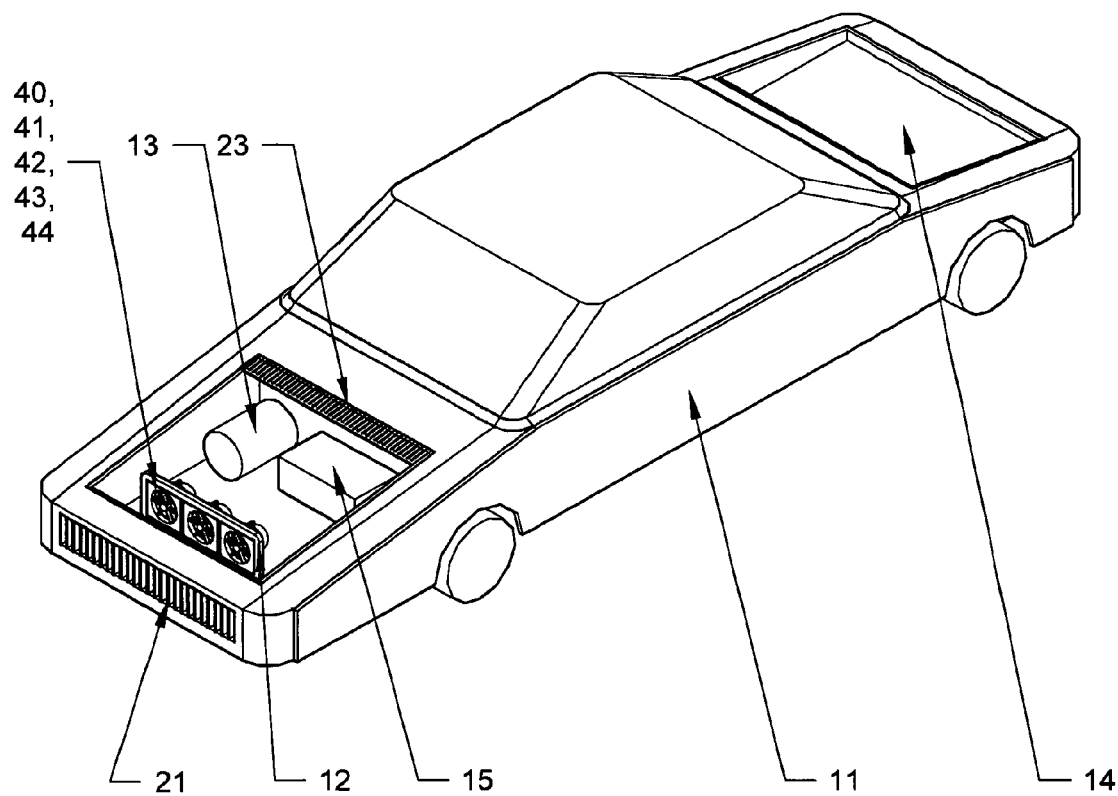
FIG. 1 is a perspective drawing of an electrically powered vehicle including the present embodiment in a typical installation.

REFERENCE NUMERALS 11 vehicle
12 turbine generator mounting assembly
13 traction drive motor
14 vehicle battery
15 power management unit
21 front air intake grills
22 intake air chamber
23 upper discharge port
24 exhaust air chamber
31 lower discharge space
32 front compartment rear wall
40-44 turbine generators
46 turbine generator mounting bracket
50 turbine generator plenum housing
51 turbine
52 turbine blades
53 turbine hub
54 generator
55 plenum mounting braces.
70 central processor
71 ultra capacitor
72 power management module
73 regenerative energy source
74 solar panel energy source
75 vehicle accessories
80 ultra capacitor variable charge profile circuitry
81 system isolation/protection circuitry

DETAILED DESCRIPTION OF THE INVENTION

FIG. 1 shows the major electrical components of the embodiment as typically installed in an electrically powered vehicle 11. Turbine generator mounting assembly 12, containing turbine generators 40, 41, 42, 43, 44, is fixed in a forward position in the front compartment of the vehicle, mounted to the frame and body of the vehicle. Electric traction drive motor 13 will be typically mounted in the front compartment. Vehicle battery 14 is shown for illustration in the rear of the vehicle and may be a multiple cell battery or a set of such batteries comprising a battery pack. One battery or pack is shown in this embodiment but in an alternative embodiment two separate and equivalent batteries are used with one an active drive energy source and the other a 'hot' spare being charged by the ram air charging system. When the active battery reaches a pre-programmed minimum level of charge, the batteries are electrically switched and their roles reversed thereby further extending the vehicle driving range. Power Management Unit (PMU) 15 contains a central processor and regulating, control and conditioning electronics, known in prior art, to manage the charging system. Front grills 21 provide ram air intake to the intake air chamber 22 and turbine generator mounting assembly 12. Upper exhaust air discharge port 23 provides venting of exhaust air to ambient space.

Figure 2:
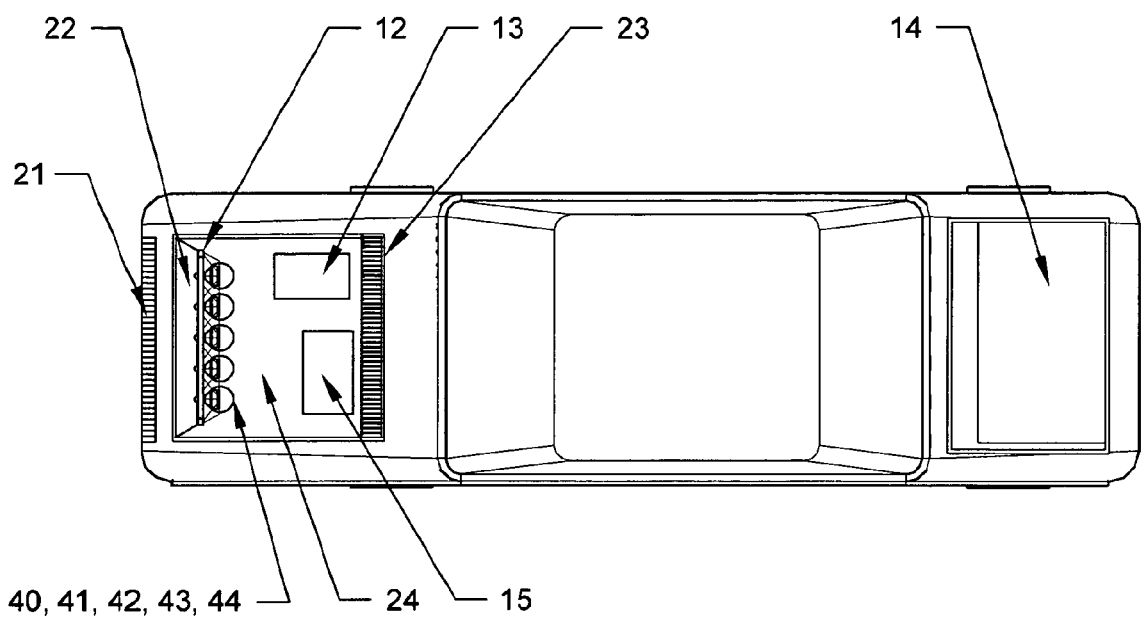
FIG. 2 is a top view of the vehicle of FIG. 1 showing one positioning of the major components of the embodiment.

Referring to FIG. 2, the aerodynamically configured intake 21 and air chamber 22 direct ram air flow to mounting assembly 12. The ram air intake 21 is similar to modern vehicle front grills with grill elements configured to stabilize air flow as it enters the air chamber 22. Chamber 22 is affixed and sealed to the vehicle body at front and sides of the front compartment and to the forward surface of assembly 12. Ram air from forward intake grill 21 impinges the blades of the turbine generator devices 40, 41, 42, 43, 44 mounted in assembly 12 causing them to rotate and output an electric current to charge the battery and power other vehicle electrical components.

Figure 3:
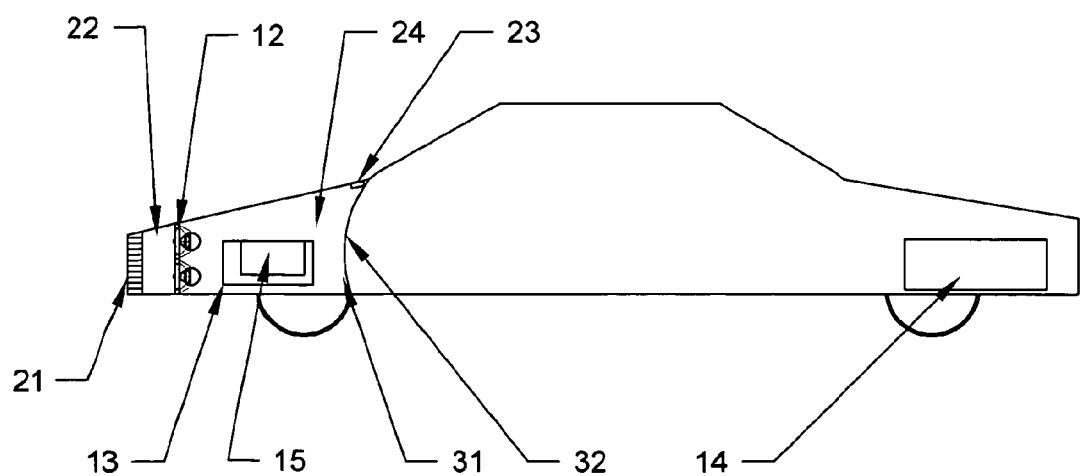
FIG. 3 is a side view of the of the vehicle of FIG. 1.

Referring to FIG. 2 and FIG. 3, exhaust air chamber 24 shown is one embodiment of exhaust air flow ducting to upper discharge ports 23 and lower exhaust space 31. The primary concern is the avoidance of back pressure on the turbine blades from exhaust air which will impact turbine efficiency. Exhaust air management in the forward compartment maintains a wide flow area 24 immediately to the rear of mounting assembly 12 similar to the open space configuration of the engine compartment of most modern automobiles. The rear or firewall 32 of the engine compartment is slightly convex in the vertical plane to direct exhaust air to discharge to ambient space 31 beneath the engine compartment and to the upper discharge ports 23 of the vehicle. An alternate embodiment will add exhaust air vents at both sides of the rear of chamber 24 to increase air flow to ambient space. This configuration provides cooling air to components located in the vehicle forward compartment.

FIG. 3 side view of vehicle 11 further clarifies component placement and air flow management.

Figure 4:
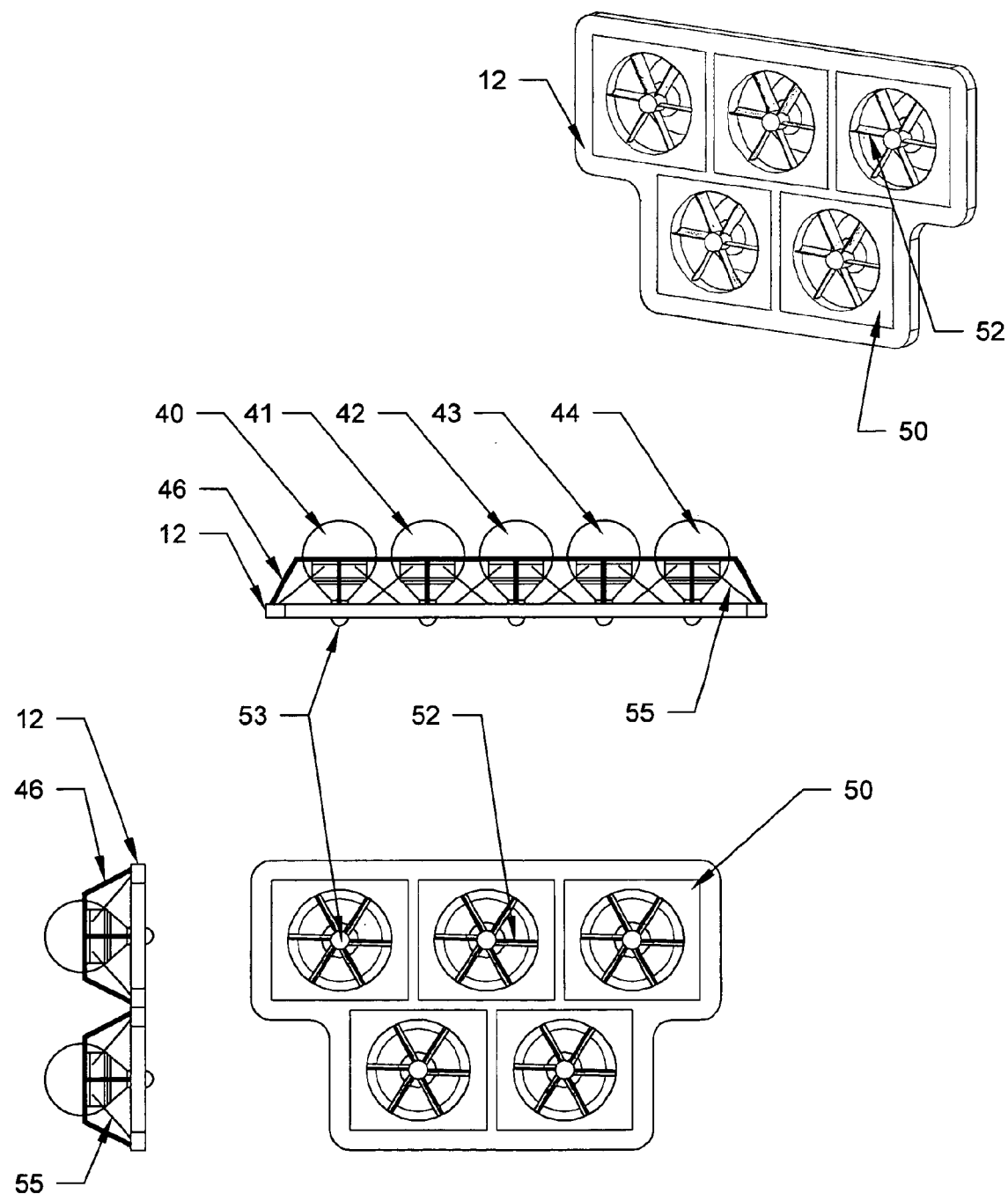
FIG. 4 is several views of the turbine generator mounting assembly of FIG. 1.

FIG. 4 is four views of the turbine generator mounting assembly 12 showing one placement of the plurality of turbine generator devices 40, 41, 42, 43, 44. Mounting assembly 12 is a rigid material of sufficient strength to accept the weight and road shock stress of said turbine generator devices without distortion. This shows five (5) turbine generators but the number and size may vary according to charging requirements and system efficiency achieved. The separation of turbine generator mounting openings in assembly 12 shall be the minimum consistent with good practice for strength and shock and vibration durability in order to maximize the flow-through performance of the assembly and minimize the drag baseline of the embodiment. Devices 40, 41, 42, 43, 44 are mounted in spaced openings in assembly 12 and secured against road shock by bracket 46. The method of mounting assembly 12 in a vehicle will vary according to specific forward compartment configuration but attachment points will be at strength points of the chassis, frame and body of the vehicle. Remaining descriptions will consider a single turbine generator device since all five shown are alike. 50, 52, 53 and 55 are integral to the turbine generator device and are described in FIG. 5

Figure 5:
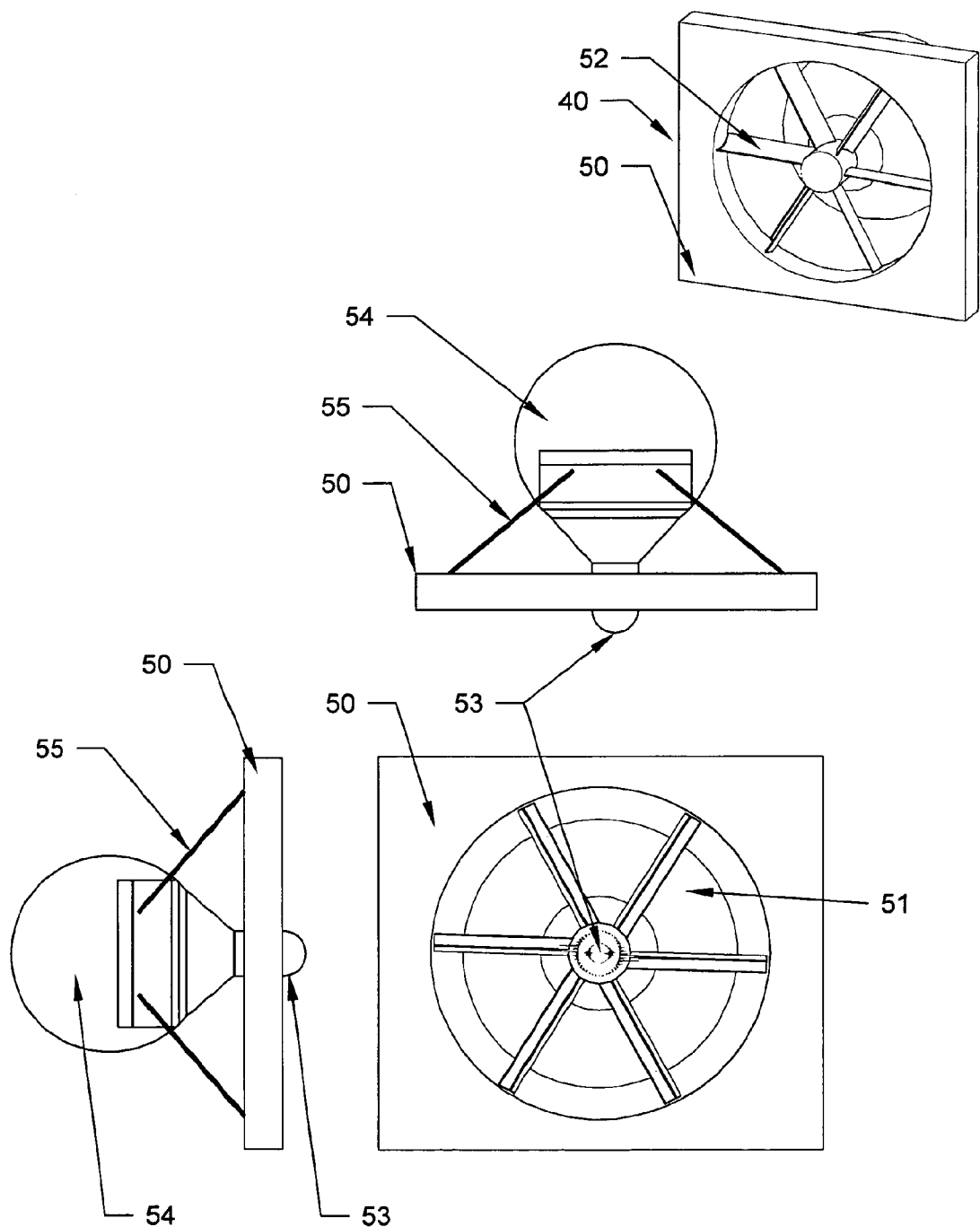
FIG. 5 is several views of the turbine generator device of FIG. 4.

Referring to FIG. 5, turbine generator device 40 is comprised of plenum housing 50, turbine 51, a plurality of turbine blades 52, hub 53, generator 54 and mounting braces 55 that are integral to device 40. Turbine blades 52 attach to hub 53 that is directly coupled to the rotor axis of generator 54 so that ram air caused rotation of the turbine blades 52 rotates the rotor of generator 54 and causes current to flow in the generator. Hub 53 contains electro-mechanical means to change the angle, or pitch, of the turbine blades relative to the direction of ram air flow from a position of maximum ram air force on the blades and consequent maximum torque and rotational speed of the generator rotor to a position of minimum torque and rotational speed. This enables maximum harvest of ram air energy during low speed travel of the vehicle and, at highway speeds, allows control of torque, rotation speed, generator output and turbine, blade noise while allowing effective battery charging to continue and cooling air to flow in the vehicle. Variable pitch turbine generators are known in prior art. The present embodiment further incorporates the program control means to adjust selectively the pitch angle of each set of turbine generator blades to provide additional control of the combined turbine generator outputs and total turbine caused drag. Hub 53 and generator 54 are shrouded to form an aerodynamic shape typical of direct drive wind generators. The preferred embodiment of generator 54 is a permanent magnet, axial flux generator or alternator of known design for reasons of light weight, efficiency and versatility, however, this embodiment is not meant to limit, in any way, the selection of the generator or alternator to be used. Application of the axial flux generator enables the further ability, noted herein and in prior art, to manage generator torque and output by varying the rotor-stator air gap of the generator. Changing the air gap changes the magnetic flux density acting on the rotor and thereby can be used to adjust the torque load and electrical output of the generator.

Figure 6:
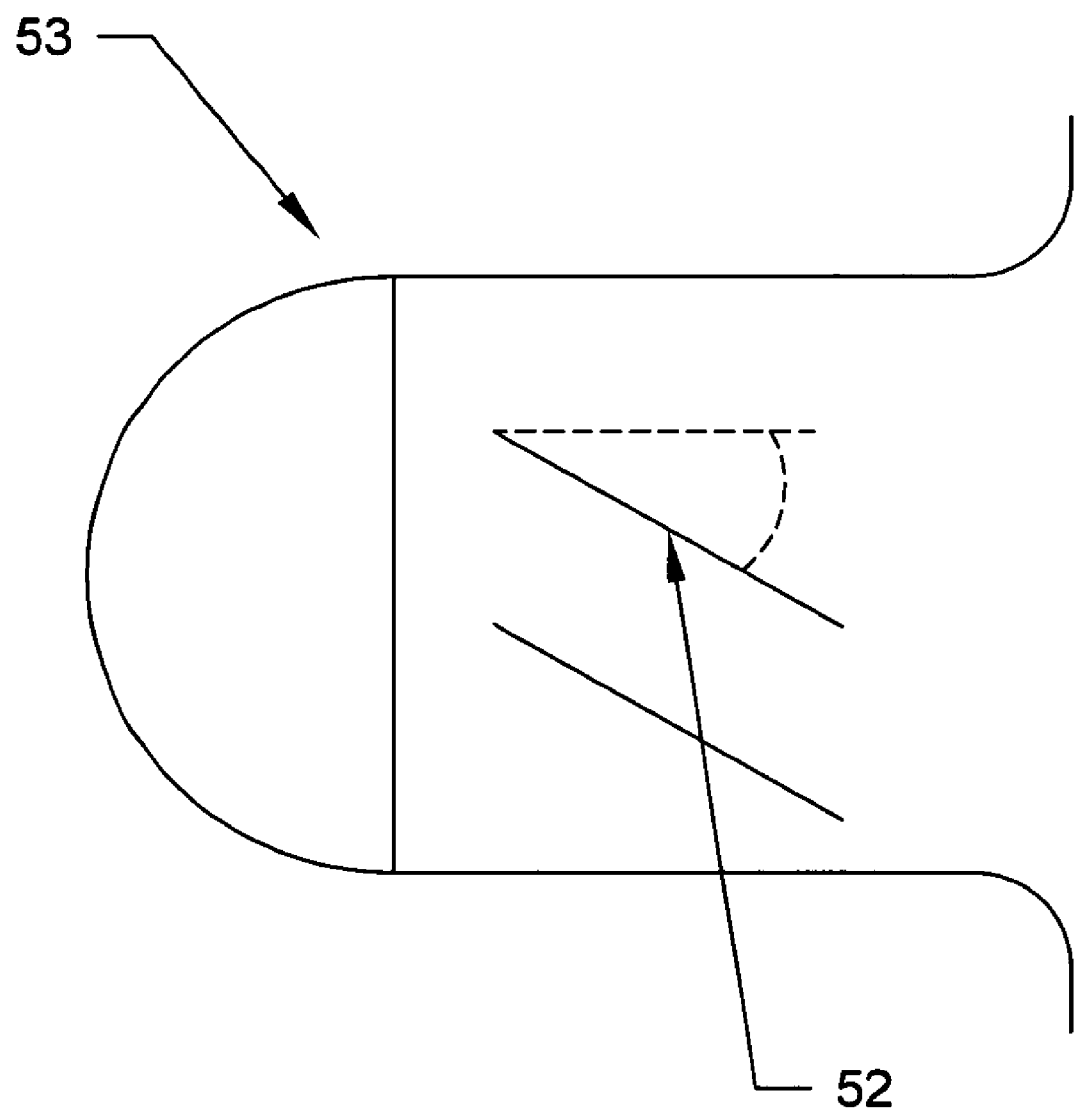
FIG. 6 is a detail view of the hub and blade portion of the turbine generator device of FIG. 5 showing angular change of the turbine blades.

In FIG. 6, turbine blade 52 angular change at hub 53 has incremental step positions.

Figure 7:
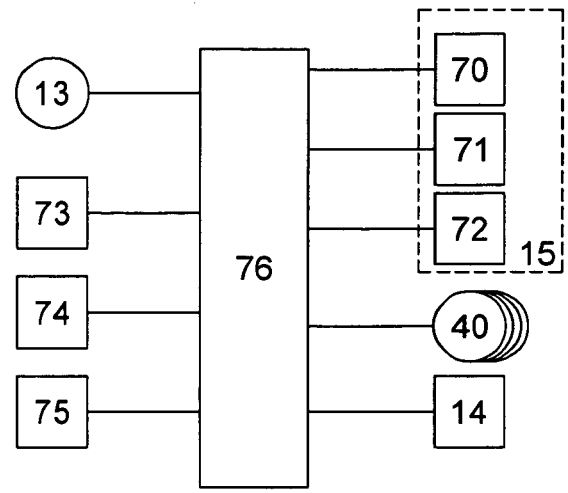
FIG. 7 is a system block diagram of the present embodiment.

FIG. 7 is a system block diagram of the charging system. Bus 76 provides addressable connectivity to the system components. The Power Management Unit (PMU) 15 is shown as a dotted line block in order to illustrate its major components—Central Processor 70, Ultra Capacitor 71 and Power Conditioning Module 72. The Central Processor 70 is programmed to provide sensing and control of ultra capacitor 71 charge/discharge, turbine blade angle adjustment and, if included, generator air gap control. Battery 14 is shown as a single block but may be one or two battery packs as described herein. Drive motor 13, Regenerative Energy Source 73, Solar Panel 74 and Accessories 75 are included to illustrate the integration of the present embodiment with the electrical system of the vehicle.

Figure 8:
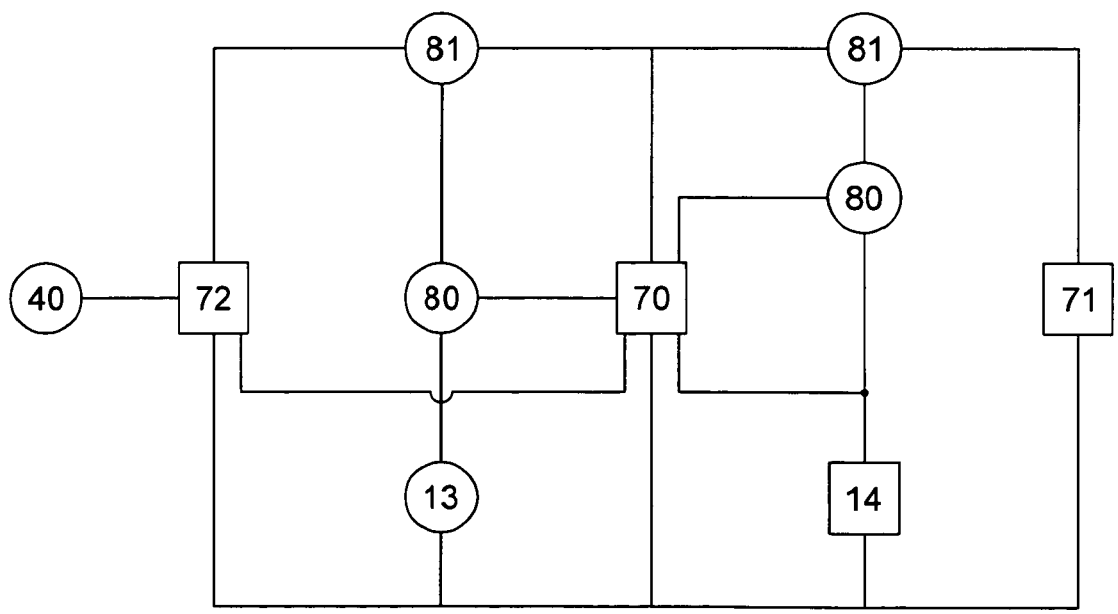
FIG. 8 is a partial schematic of the charging system showing one embodiment of the ultra capacitor connectivity between the vehicle battery, traction drive motor and the turbine generator output interface.

FIG. 8 is a simplified schematic of ultra capacitor (UC) 71 connectivity to show that its connectivity and charge/discharge profile are controlled by Central Processor (CP) 70 as in prior art. A single ultra capacitor is shown to simplify the drawing but a plurality of ultra capacitors is required. Ultra capacitor electrical connectivity between battery 14 and turbine generators is initiated when battery charge level approaches full charge and charge resistance reaches a predetermined level that would create an unacceptable torque requirement on the turbine generators with consequent increase in turbine caused drag. Ultra capacitor charge and discharge times are much faster than a battery so that the ultra capacitor will maintain an optimum level of charge resistance at the generator outputs while continuing to charge the battery at the rate specified for the type of battery and state of charge. This control technique also serves to extend battery life. Sensing and switching circuitry provides capacitor surge power application to the drive motor as needed. The charge/discharge profile of UC 71 is controlled by CP 70 through application of variable circuitry 80, known in prior art, to maintain a moderate level of charge resistance load at the generator outputs while charging the battery. The charge circuitry includes isolation and pulse protection components 81, known in prior art, to protect the battery, drive motor and ultra capacitor to ensure their expected cycle lives. Electrical cabling and wiring of this embodiment are of standard practice for such a vehicle system to meet electrical and signal requirements of component rated specifications as chosen for a particular vehicle design.

Figure 9:
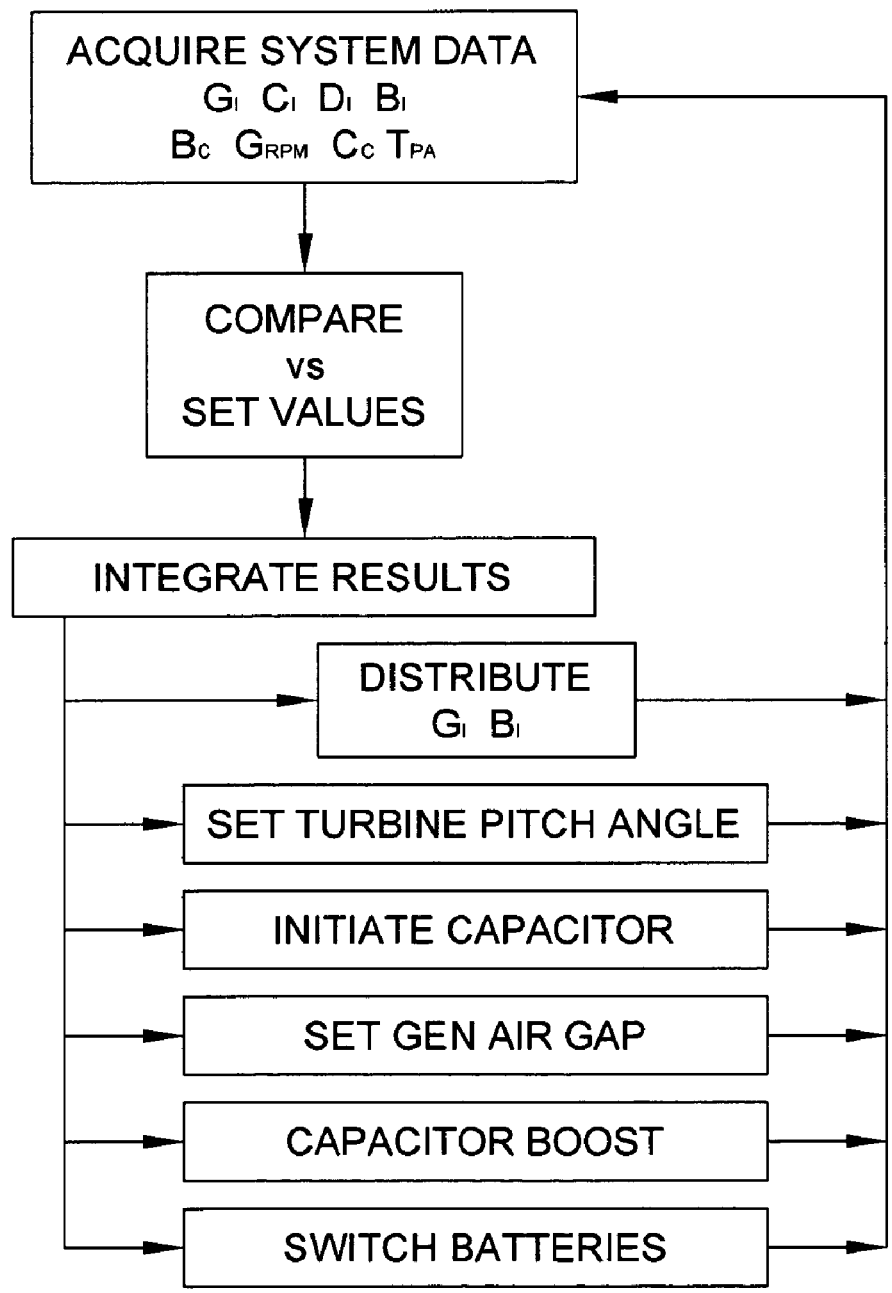
FIG. 9 is a flow chart of system operation.

FIG. 9 is a flow chart of the operation of this embodiment wherein pertinent system data are acquired: current value symbols are shown for simplicity but, in practice, component and system voltages are also measured and integrated in the decision process as well. $G_{subI}$ are individual generator output currents; $C_{subI}$ is capacitor charge/discharge current; $D_{subI}$ is vehicle demand current; $B_{subI}$ is battery charging/discharging current; $B_{subC}$ is battery charge level; $G_{subRPM}$ are rotation speeds of individual turbine generators; $C_{subC}$ is capacitor charge state; $T_{subPA}$ are turbine pitch angles; Switch positions and settings of control devices are also monitored. Data are then compared with preprogrammed values. Comparison results are then integrated. Instructions are then sent to appropriate components for actions necessary to maintain system data within programmed limits. The process iterates.

Operation

The electric vehicle 12, as it moves forward through the ambient air mass, will cause air to flow at a velocity near the vehicle speed through the intake grill 21 into air chamber 22. Resulting ram air will impinge the blades of turbine generators 40-44 causing them and generator(s) 54 to rotate and an electric current to flow in the generators and the charging system. Air will flow through the turbine blades 52 into exhaust air chamber 24 and out exhaust port 23 and exhaust space 3. Generated electric current is connected through circuitry controlled by Central Processor 70 to recharge vehicle battery 14 and power traction drive motor 13 and accessories 75.

The dynamic resistance of the turbine generators to air flow is manifest as additional vehicle drag. This drag increases proportional to vehicle speed and requires expenditure of additional drive energy to maintain vehicle speed. The objective of this embodiment is to ensure that turbine generated electrical energy exceeds the turbine drag induced traction drive energy at most vehicle speeds. In so doing battery charge level is maintained over extended time and the driving range of the electric vehicle between external charging is increased. Turbine blades 52 are variable in pitch angle relative to air flow direction. Central processor (70) monitors blade pitch angle, generator RPM and output and system current demand and distribution. It will adjust pitch angle to optimize these parameters and minimize turbine caused drag at different vehicle speeds. Typically, turbine blade angle will be maximum at lowest vehicle speeds and reduce as speed is increased and ram air flow velocity is high.

Additional turbine induced dynamic drag is caused by system resistance to current flow seen as additional electrical load at the generator outputs. The primary cause is battery charge resistance at high levels of battery charge. This increases the opposing torque load on the turbine generator and, again, manifests as additional drag. Central processor 70 monitors battery charge level, generator output and RPM and system current flows and initiates a programmed charge/discharge profile by the ultra capacitor to maintain a moderate electrical load at the generator output while enabling continued battery charging and current distribution.

The embodiment as described herein is a preferred design, however, said embodiment can be changed within the spirit and scope of this description. This application is intended to cover any variations, applications or adaptations of the embodiment using its general principles of managing charging performance and turbine caused drag. This application is meant to cover any departures from the present description that come within known or customary practices in the art to which this embodiment pertains and fall within the limits of appended claims.

CONCLUSION, RAMIFICATIONS AND SCOPE

Accordingly, the reader will see that at least one embodiment provides a reliable means to harvest efficiently the ram air energy generated by a moving electric vehicle to extend the driving range of the vehicle and reduce the frequency of required external re-charging of the vehicle energy storage devices.

The embodiment maintains an optimum ratio of the turbine generated energy to the drive energy expended to minimize turbine caused aerodynamic drag of the vehicle. Therefore, precise management of turbine generator performance and vehicle power distribution in varying speed and charge state conditions is achieved:

The pitch angle of turbine blades is variable enabling precise control of both generator output and turbine caused drag at most vehicle speeds.

The air gap between generator rotor and stator is variable in some generators which, if needed, further enhances control of turbine generator performance.

The ultra capacitor component of the embodiment, through its rapid charge/discharge characteristic, enables charging to continue even at a high battery charge level by de-coupling the charge resistance effect from the generator output. The turbine generator can then continue to operate at an optimum output/drag level proportional to vehicle speed and output can be distributed to other vehicle components. The ultra capacitor is a source of surge power for acceleration.

Although the description above contains many specifics, these should not be construed as limiting the scope of the embodiment but as merely providing illustration of some of the presently preferred embodiments reflecting currently available technology. For example, the turbine generator can be a generator or alternator of many designs, configurations and materials. The turbine generator assembly can be installed in any reasonable location that will provide maximum effectiveness for a given vehicle configuration. The battery and ultra capacitor can be of different types, even redundant with active and stand by elements.

Thus the scope of the embodiment should be determined by the appended claims and their legal equivalents rather than by the examples given.

I claim:

1. An apparatus, which is installed in an electrically driven vehicle, containing at least one ram air driven variable pitch turbine electric generator to provide electric energy to be stored in at least one battery energy storage device to power electrical components of said vehicle and at least one power management unit to comprise a computer controlled battery charging system that will adjust said turbine blade angles and electrically de-couple said battery charge resistance load from said generator to minimize drag caused by said turbine and maintain ram air generated energy flow, caused by said vehicle motion, to said battery that compensates for said vehicle drive energy expended to overcome said turbine caused drag in varying conditions of said vehicle speed and said battery charge level;
   (a) At least one ram air driven electric generator driven by a variable pitch wind turbine mechanically coupled to and driving the rotor of said generator and mounted in an assembly which is positioned within the engine compartment of said vehicle;
   (b) At least one battery energy storage device providing primary operational power to said vehicle;
   (c) At least one ultra capacitor auxiliary device electrically connected to said generator and said battery and controlled by said computer that will de-couple said battery electrical resistance load from said generator to minimize electrical torque load on said turbine generator and reduce drag caused by said turbine;
   (d) At least one air intake, outlet and ductwork in said engine compartment to direct ram air flow created by vehicle motion to impinge blades of said turbine and cause said turbine and said generator rotor to rotate and cause current to flow in said generator and to discharge said air flow to ambient space after it passes through said turbine blades;
   (e) The blades of said turbine being variable, under said charging system computer control, in angular position relative to the direction of ram air flow to adjust said blade surface area exposed to ram air force at varying speeds of said vehicle and minimize said turbine caused drag;
   (f) Said generator being electrically connected by said computer controlled charging system to charge said battery energy storage device and said ultra capacitor and power electrical components of said vehicle.

2. The apparatus of claim 1 further comprising said assembly in which at least one turbine generator is integrally mounted and said assembly is positioned within the engine compartment of said vehicle so that the rotation plane of said blades is transverse to the direction of motion of said vehicle.

3. The apparatus of claim 2 wherein said turbine generator is mounted in said assembly within a plenum housing that serves to channel said ram air flow to impinge on said turbine blades causing them to rotate.

4. The apparatus of claim 1 further comprising said air ducting directing said ram air flow to said turbine generators from said air intake.

5. The apparatus of claim 1 further comprising at least one said air chamber to direct exhaust air flow from said turbine blades to at least one said discharge opening in said vehicle.

6. The apparatus of claim 1 wherein said turbine and said generator are mechanically coupled so that said ram air caused rotation of said turbine blades and said turbine shaft causes the rotation of said generator rotor thereby converting rotational energy to electrical energy and causing a current to flow in said generator and said charging system.

7. The apparatus of claim 6 wherein said turbine consists of a plurality of said blades attached at a central hub and axle; further said blades are electro-mechanically variable in angle relative to said ram air flow direction, said variation taken under computer control to minimize said turbine caused drag and maintain required said generator energy output to said battery.

8. The apparatus of claim 6 further comprising the means by which the electrical and physical states and conditions of said charging system components and said vehicle electrical components are measured and, at predetermined values of said measurements, said angular position of said blades is changed.

9. The apparatus of claim 6 further comprising the means by which said blade angle change of each said turbine is taken selectively under said computer control to provide precise control of the total drag caused by said turbines at all vehicle speeds.

10. The apparatus of claim 1 further comprising the means by which, when said battery electrical resistance load on said turbine generator reaches a predetermined level said computer initiates a programmed charge/discharge profile of said ultra capacitor that will de-couple said battery resistance load from said generator to minimize said turbine caused drag and continue to charge said battery at higher levels of said battery charge.

11. The apparatus of claim 1 further comprising the means by which the electrical and mechanical characteristics, performance and switch position states of said components of said charging system are sensed, measured and controlled to minimize the overall said turbine caused drag induced by varying speeds of said vehicle and varying charge levels of said battery in order to manage said charging system performance and maintain said generator energy flow to said battery that compensates for drive energy expended to overcome said turbine caused drag to charge said battery energy storage device and power said electrical components of said vehicle.

12. The apparatus of claim 1 wherein claimed components of said charging of claim 1 herein are electronically, electrically and mechanically integrated to form said charging system and to operate in said vehicle to minimize said turbine caused drag and extend the driving range of said vehicle.

\* \* \* \* \*